United States Patent
Henzler et al.

(10) Patent No.: US 9,669,467 B2
(45) Date of Patent: Jun. 6, 2017

(54) TOOL SYSTEM

(71) Applicant: CERAMTEC GMBH, Plochingen (DE)

(72) Inventors: Uwe Henzler, Hochdorf (DE); Uwe Stemmer, Nürtingen (DE)

(73) Assignee: CeramTec GmbH, Plochingen (DE)

( * ) Notice: Subject to any disclaimer, the term of this patent is extended or adjusted under 35 U.S.C. 154(b) by 538 days.

(21) Appl. No.: 14/353,425

(22) PCT Filed: Oct. 25, 2012

(86) PCT No.: PCT/EP2012/071097
§ 371 (c)(1),
(2) Date: Apr. 23, 2014

(87) PCT Pub. No.: WO2013/060752
PCT Pub. Date: May 2, 2013

(65) Prior Publication Data
US 2014/0294520 A1 Oct. 2, 2014

(30) Foreign Application Priority Data

Oct. 26, 2011 (DE) .................. 10 2011 085 250

(51) Int. Cl.
*B23B 27/00* (2006.01)
*B23B 27/16* (2006.01)
*B23B 27/10* (2006.01)

(52) U.S. Cl.
CPC .......... *B23B 27/1666* (2013.01); *B23B 27/10* (2013.01); *B23B 27/16* (2013.01); *B23B 27/1625* (2013.01); *B23B 2200/088* (2013.01); *B23B 2231/04* (2013.01); *B23B 2250/12* (2013.01); *Y10T 82/10* (2015.01);
(Continued)

(58) Field of Classification Search
CPC ............ B23B 27/1666; B23B 27/1677; B23B 27/1662; B23B 29/046; B23B 2205/12
See application file for complete search history.

(56) References Cited

U.S. PATENT DOCUMENTS

| | | | | |
|---|---|---|---|---|
| 2,062,607 A | * | 12/1936 | Reaney | ................... B23B 27/16 407/112 |
| 3,102,326 A | * | 9/1963 | Conti | ...................... B23B 27/00 407/101 |
| 3,268,977 A | | 8/1966 | Diemond | |

(Continued)

FOREIGN PATENT DOCUMENTS

| | | |
|---|---|---|
| EP | 0 402 934 A2 | 12/1990 |
| FR | 2 134 944 A | 12/1972 |

(Continued)

*Primary Examiner* — Will Fridie, Jr.
(74) *Attorney, Agent, or Firm* — Norton Rose Fulbright US LLP

(57) ABSTRACT

A cutting tool system comprising a carrier tool, a cutting plate having a clamping recess and a clamping element with an associated clamping bolt, wherein on the underside of the clamping element, which underside faces the cutting plate, an engagement element is arranged that is in clamping contact with the clamping recess in the engaged state and thereby anchors the cutting plate, and the clamping element is guided via a chamfer in such a manner that when tightening the clamping bolt, the clamping element is pulled in the clamping direction.

15 Claims, 12 Drawing Sheets

(52) U.S. Cl.
CPC .......... *Y10T 407/14* (2015.01); *Y10T 407/227* (2015.01); *Y10T 407/2282* (2015.01)

(56) References Cited

U.S. PATENT DOCUMENTS

| | | | | |
|---|---|---|---|---|
| 3,484,920 | A * | 12/1969 | Werner | B23B 27/167 |
| | | | | 407/101 |
| 3,548,475 | A * | 12/1970 | Fiori | B23B 27/167 |
| | | | | 407/101 |
| 4,286,902 | A | 9/1981 | Gagliano et al. | |
| 4,730,525 | A * | 3/1988 | Kelm | B23B 27/00 |
| | | | | 29/39 |
| 4,848,198 | A * | 7/1989 | Royal | B23B 25/02 |
| | | | | 407/11 |
| 5,100,268 | A * | 3/1992 | Nakayama | B23B 27/1677 |
| | | | | 407/104 |
| 7,073,986 | B2 * | 7/2006 | Andras | B23B 27/1651 |
| | | | | 407/113 |
| 8,403,603 | B2 * | 3/2013 | Zitzlaff | B23B 27/1666 |
| | | | | 407/101 |
| 2009/0304466 | A1 | 12/2009 | Kabelitz et al. | |
| 2015/0086284 | A1 * | 3/2015 | Morrison | B23C 5/06 |
| | | | | 407/108 |

FOREIGN PATENT DOCUMENTS

| | | |
|---|---|---|
| JP | 2007-203437 A | 8/2007 |
| WO | 2007/080151 A1 | 7/2007 |

* cited by examiner

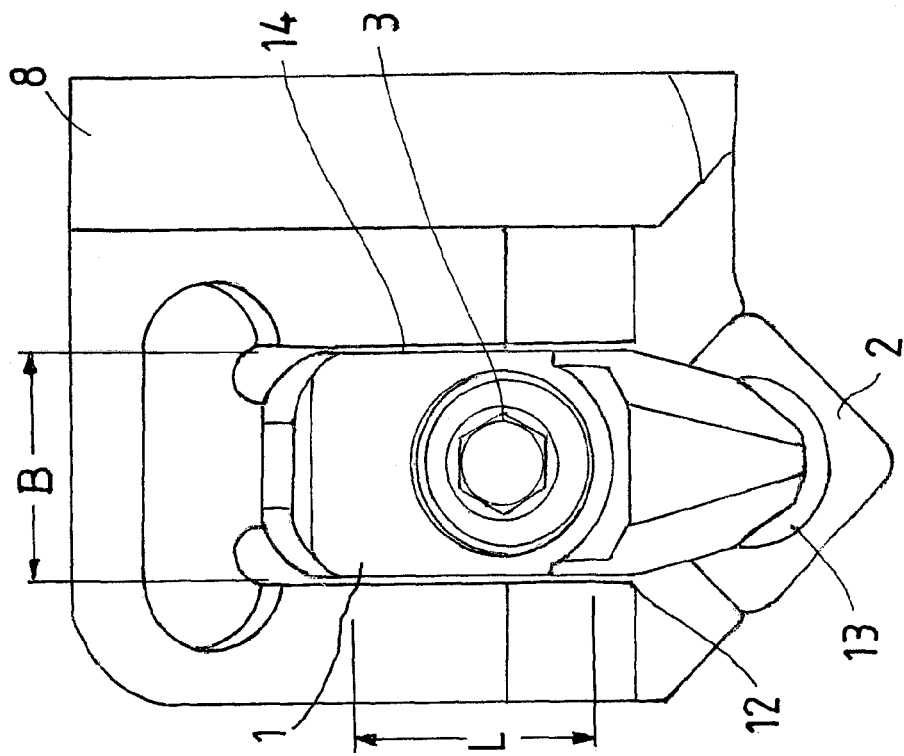
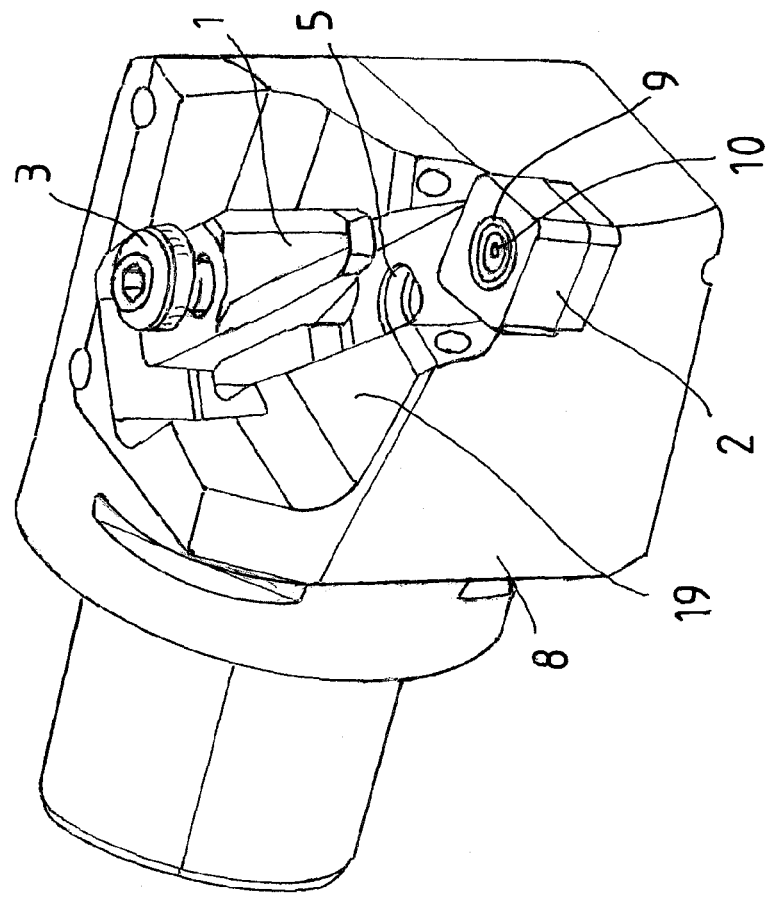

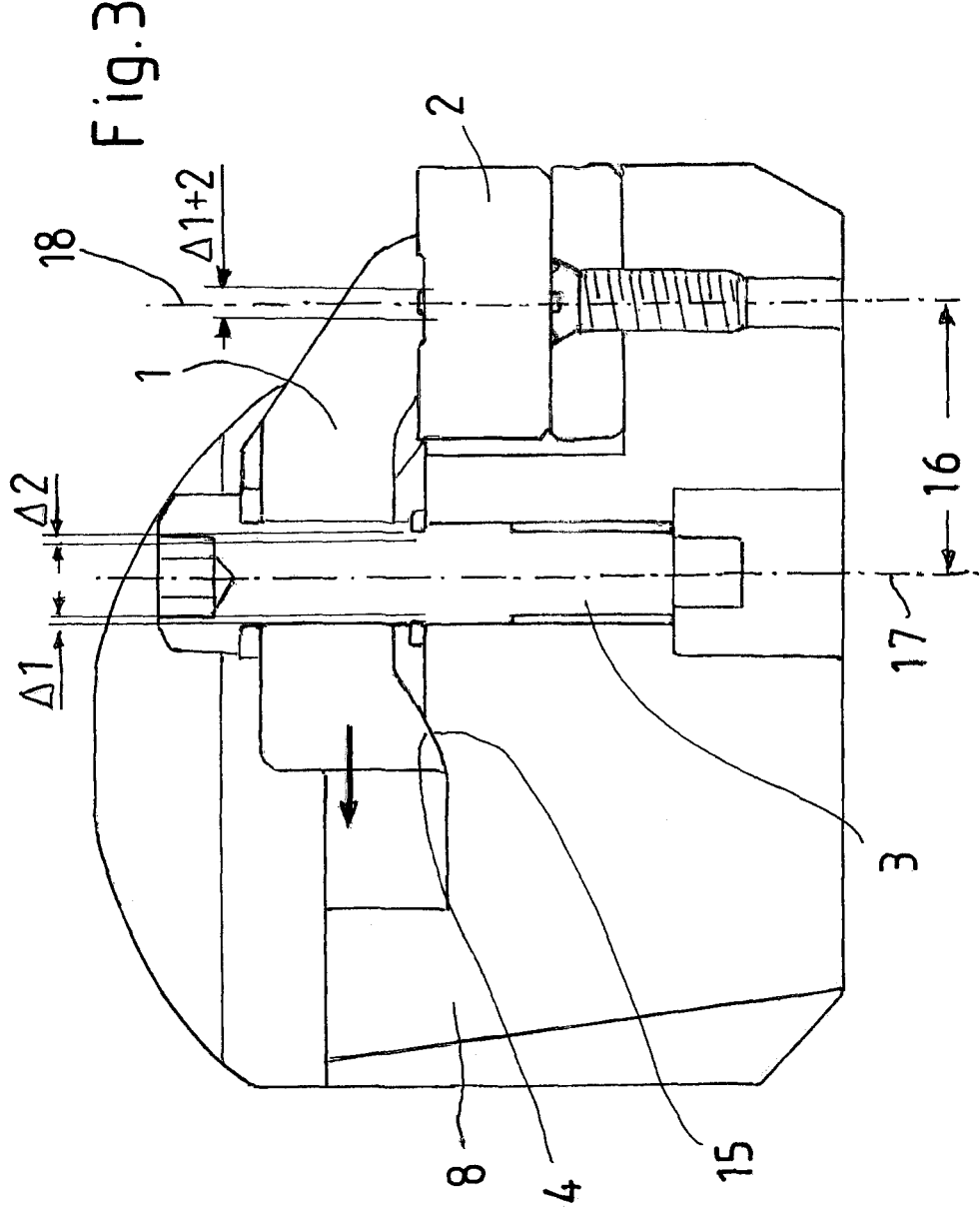

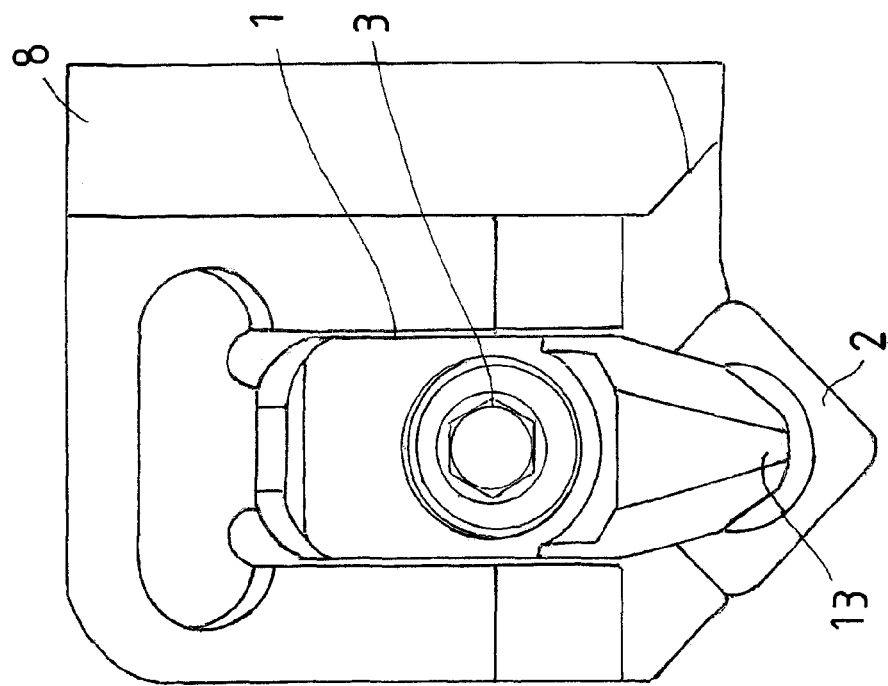
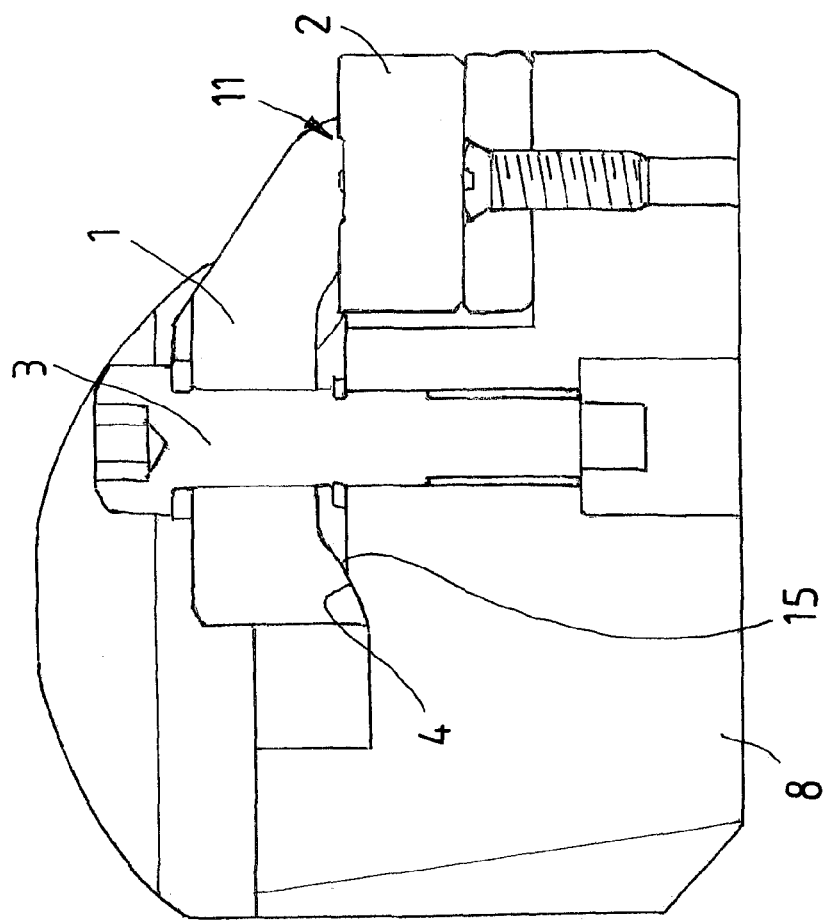

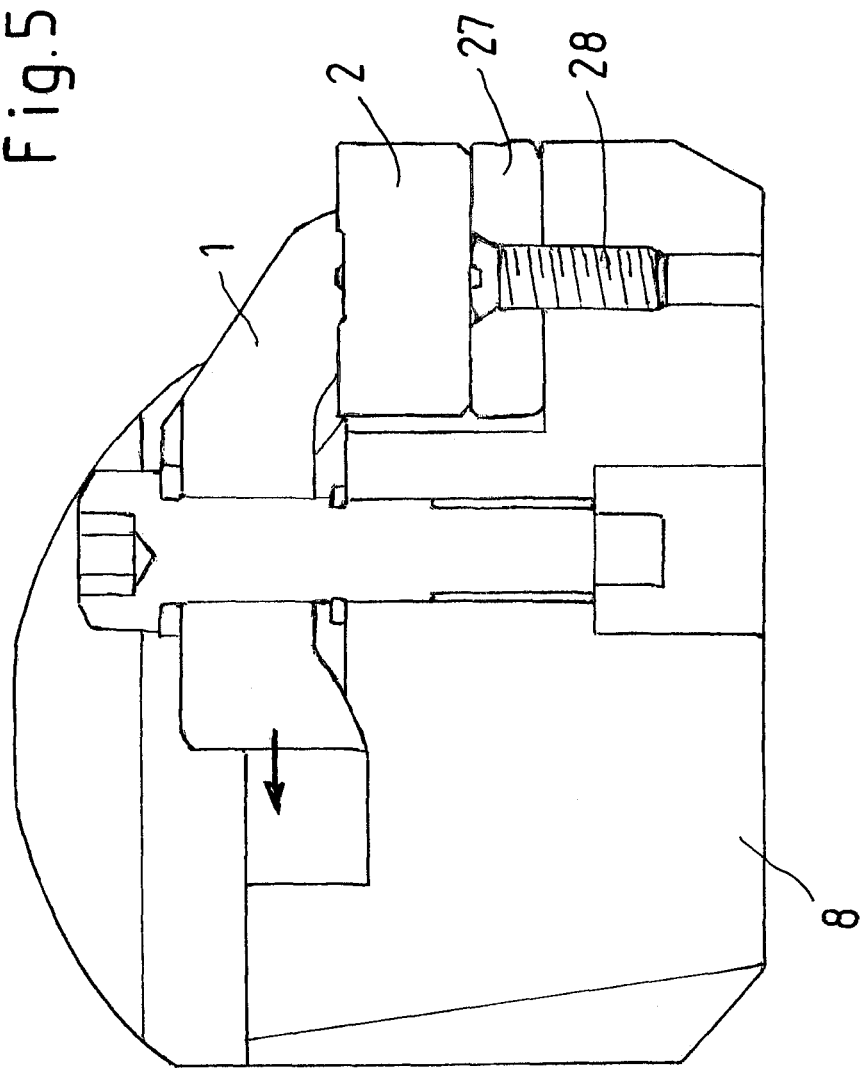

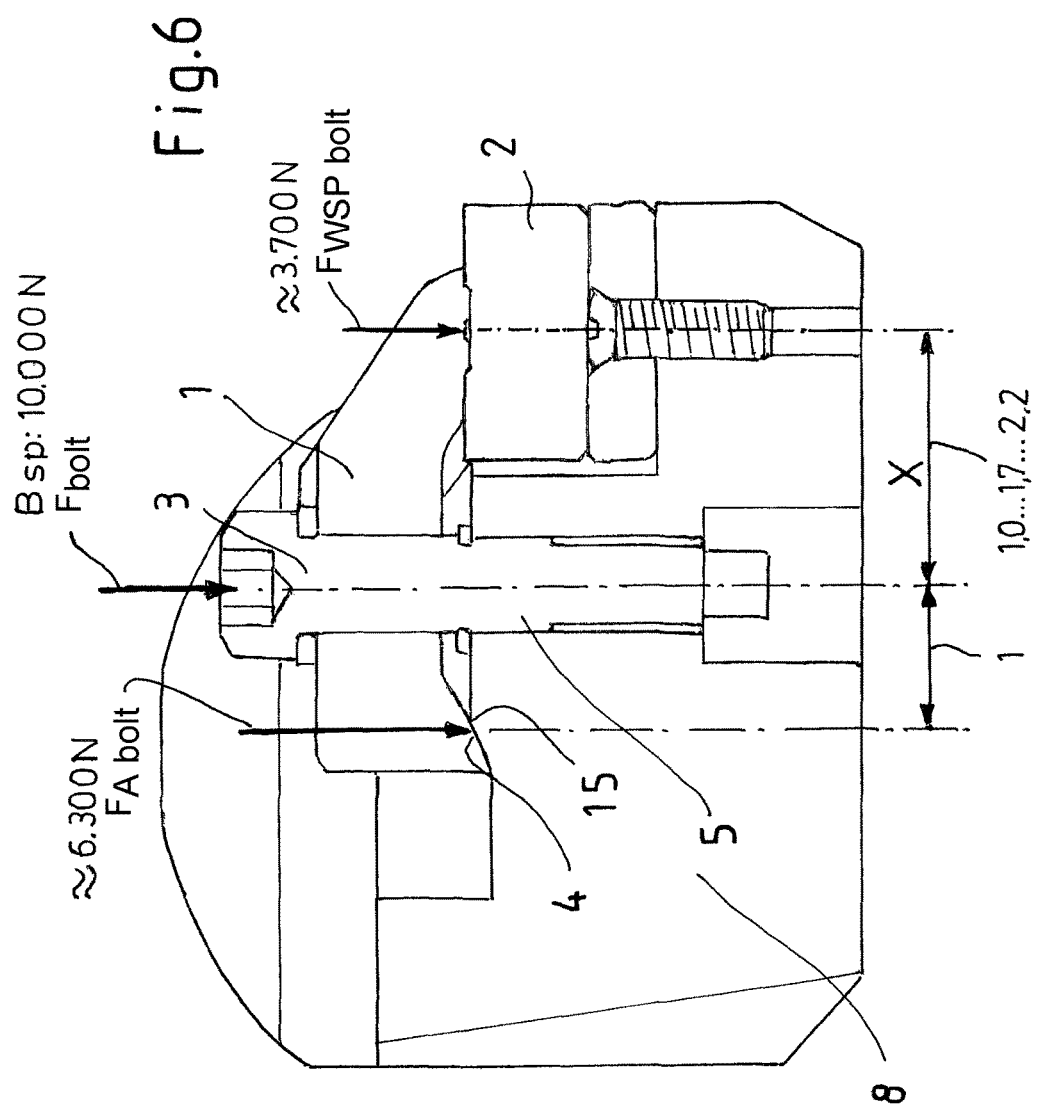

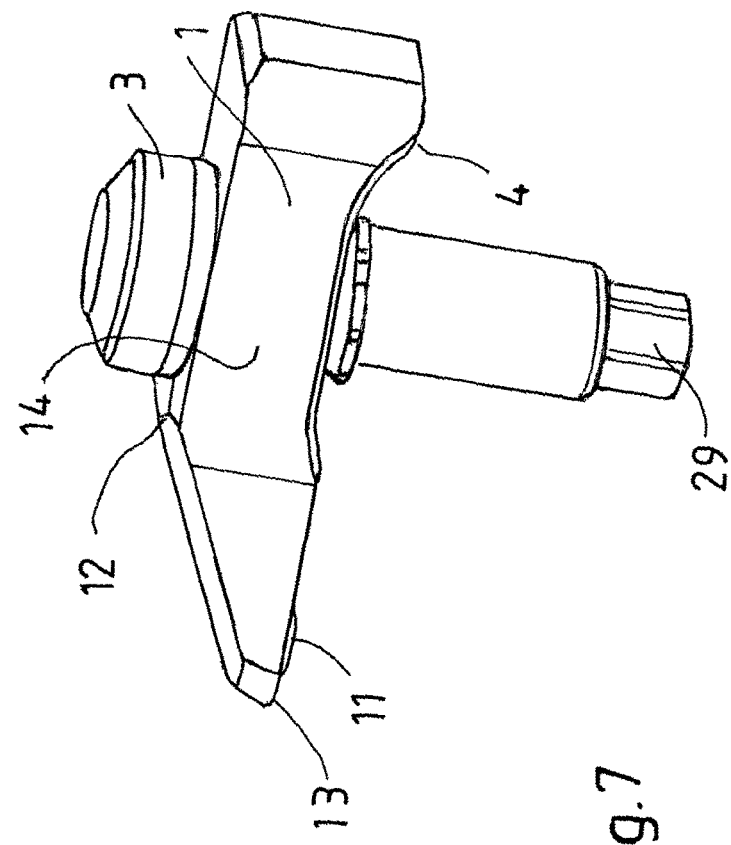
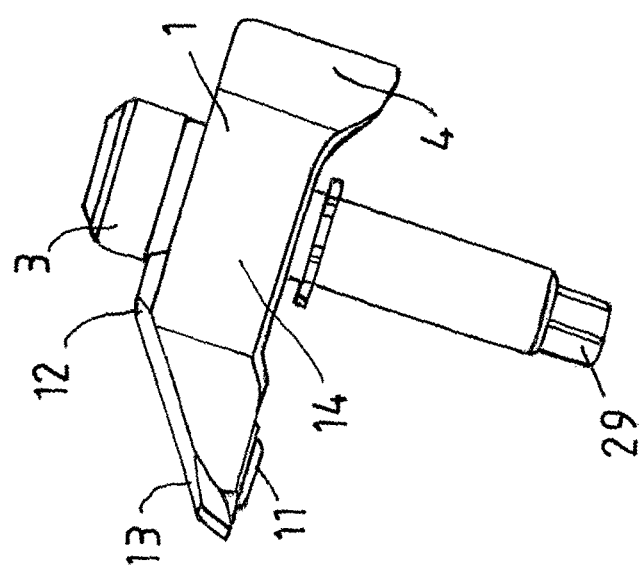
Fig. 7

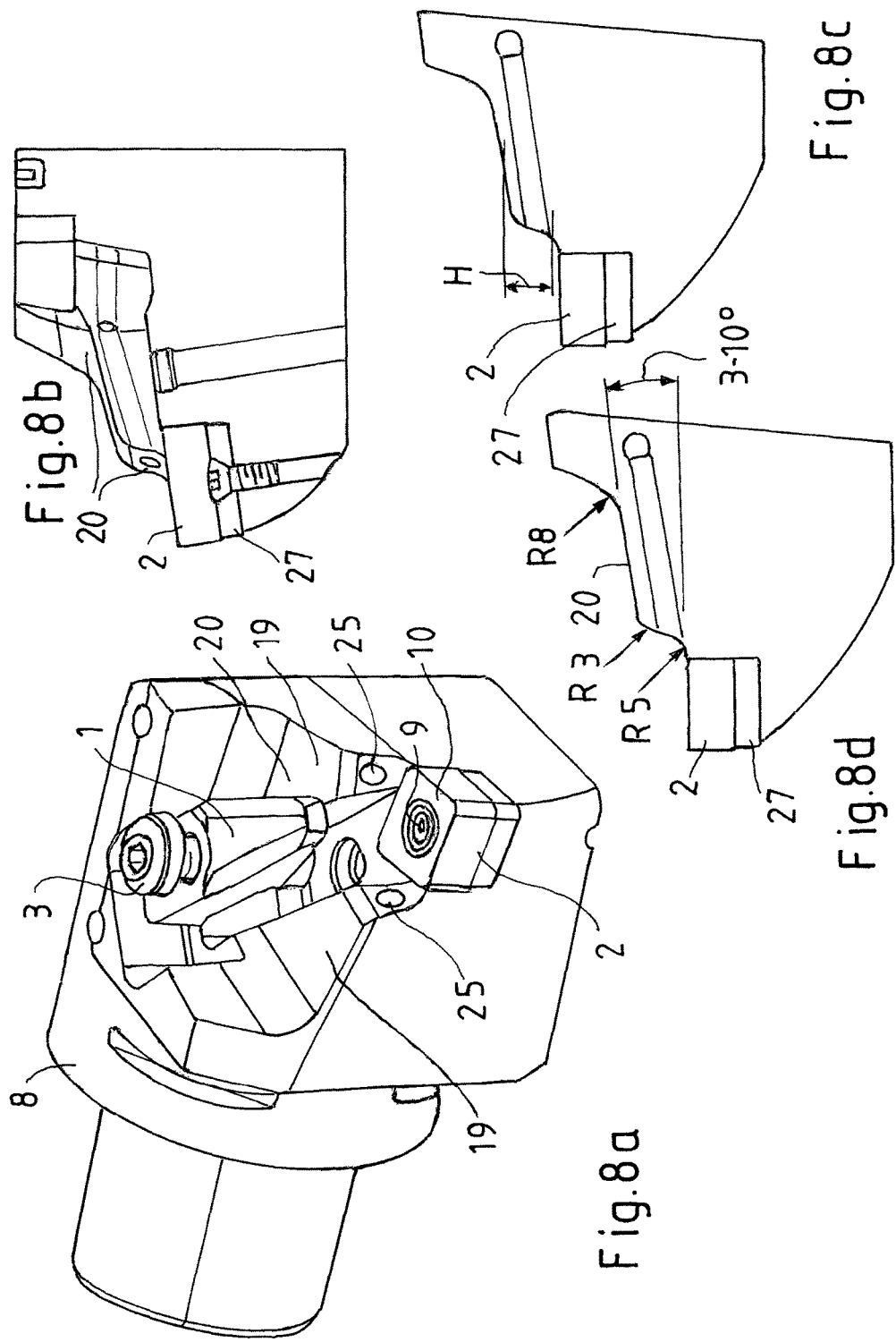

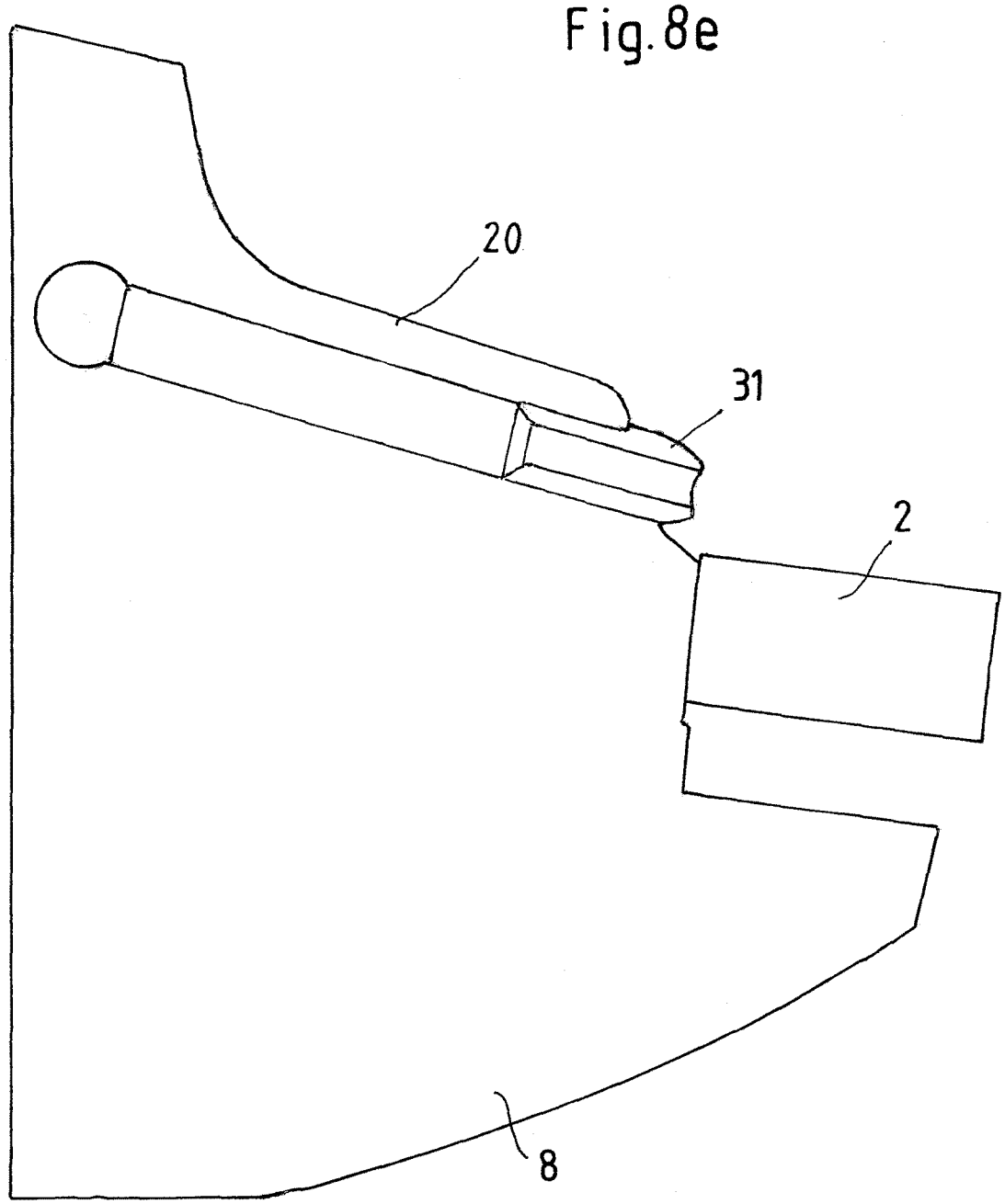

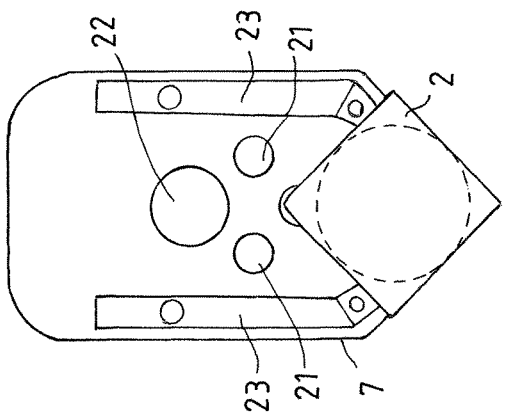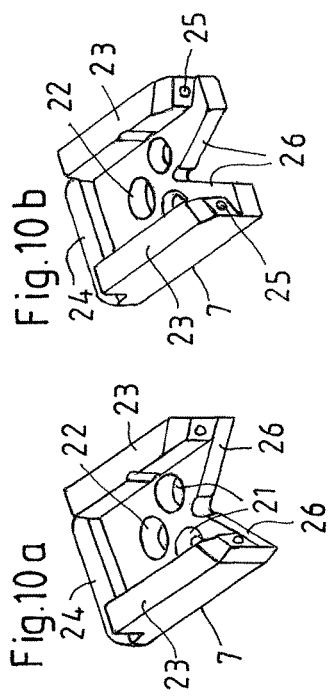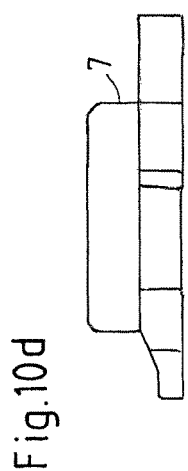

TOOL SYSTEM

This application is a §371 of International Application No. PCT/EP2012/071097filed Oct. 25, 2012, and claims priority from German Patent Application No. 10 2011 085 250.6 filed Oct. 26, 2011.

FIELD OF THE INVENTION

The invention relates to a cutting tool system comprising a carrier tool, a cutting plate having a clamping recess and a clamping element with an associated clamping bolt, wherein on the underside of the clamping element, which underside faces the cutting plate, an engagement element is arranged that is in clamping contact with the clamping recess in the engaged state and thereby anchors the cutting plate, and the clamping element is guided via a chamfer in such a manner that when tightening the clamping bolt, the clamping element is pulled in the clamping direction.

BACKGROUND OF THE INVENTION

From WO 2007080151 A1, a cutting tool system is known which consists substantially of a carrier tool that has a recess for receiving a cutting plate. The cutting plate is provided with a clamping recess. The clamping plate is held in the carrier tool by a clamping element. The clamping element, in turn, is fastened via a clamping bolt on the carrier tool. On the underside of the clamping element, which underside faces the cutting plate, an engagement element is arranged that is in clamping contact with the clamping recess and thereby anchors the cutting plate on the carrier tool. The clamping element is guided via a chamfer on the carrier tool so that when tightening the clamping bolt, the clamping element is pulled towards the carrier tool.

OBJECTS AND SUMMARY OF THE INVENTION

It is an object of the invention to improve a tool system according to the present invention in such a manner that it is also suitable for the use in rough turning operations with cutting data of up to vc 3000 m/min, ap up to 10 mm (depending on plate size and cutting plate geometry and on the material to be machined) and a feed rate f of up to 1.0 mm and higher, if applicable. Moreover, high process reliability shall be ensured.

According to the invention, this object is achieved by the features of the present invention.

Due to the fact
a. that the clamping element is arranged in a groove with parallel clamping element guides in which the clamping element is guided in a movable manner in the clamping direction, said clamping element having two parallel guide surfaces that rest flat against the clamping element guides so that the clamping element is guided on both sides in the groove,
b. that a clamping element bore for the clamping bolt is arranged in the clamping element, and in the engaged state of the cutting plate, the wall of the clamping element bore, which wall faces the cutting plate, rests against the clamping bolt, and
c. that viewed from the cutting edge of the cutting plate, the engagement element engages before the center of the clamping recess in a formfitting manner therein, the tool system is also suitable for the use in rough turning operations for material-wearing work.

BRIEF DESCRIPTION OF THE FIGURES

FIG. 1b shows a tool system according to the present invention.

FIG. 2a shows a top view of a clamping element according to the invention.

FIG. 3 depicts an embodiment of the invention.

FIG. 4a is a cut away view of an embodiment of the invention.

FIG. 4b is a top view of an embodiment of the invention.

FIG. 5 is an embodiment of the invention illustrating the retraction of the clamping element is limited by the clamping element bore.

FIG. 6 is a tool kit according to the present invention.

FIG. 7 depicts an embodiment of the invention where a clamping bolt is provided at the bolt end with an external hexagon so as to enable untightening the clamping bolt from below when changing the cutting plate.

FIG. 8a depicts an inventive embodiment and the cooling medium supply.

FIG. 8b depicts an inventive embodiment and the cooling medium supply.

FIG. 8c depicts an inventive embodiment and the cooling medium supply.

FIG. 8d depicts an inventive embodiment and the cooling medium supply.

FIG. 8e depicts an inventive embodiment and the cooling medium supply.

FIG. 10a is an embodiment showing an adapter according to the invention.

FIG. 10b is an embodiment showing an adapter according to the invention.

FIG. 10c is an embodiment showing an adapter according to the invention.

FIG. 10d is an embodiment showing an adapter according to the invention.

DETAILED INVENTION

Due to the guidance on both sides of the clamping element, secure engaging of the clamping element contour or the engagement element in the clamping recess of the cutting plate is ensured. The position of the clamping element is therefore always the same (no twisting), independent of the tool position in a space (machine), as a result of which changing the cutting plate can also be carried out, e.g., in an overhead position (in relation to the tool) without any problems. The engagement of the wall of the clamping element bore on the clamping bolt is an important feature of the invention because this results in that Δ2 equals zero (see FIG. 3), and the distance from the longitudinal axis of the clamping bolt to the center of the cutting plate is always the same. The engagement element on the underside of the clamping element thus engages at a precisely defined place in the clamping recess. This is extremely important because otherwise undefined forces act on the cutting plate. Furthermore, high process reliability is achieved by the engagement element (clamping element nose) pressing before the center of the clamping recess. Through this, upward tilting of the cutting plate is excluded. "Before the center of the clamping recess" means that viewed from the cutting edge, the engagement element engages before the center of the clamping recess in a formfitting manner therein.

According to the invention, the tool system is preferably to be designed as a monoblock tool or as a tool with an adapter.

Figure 9B:
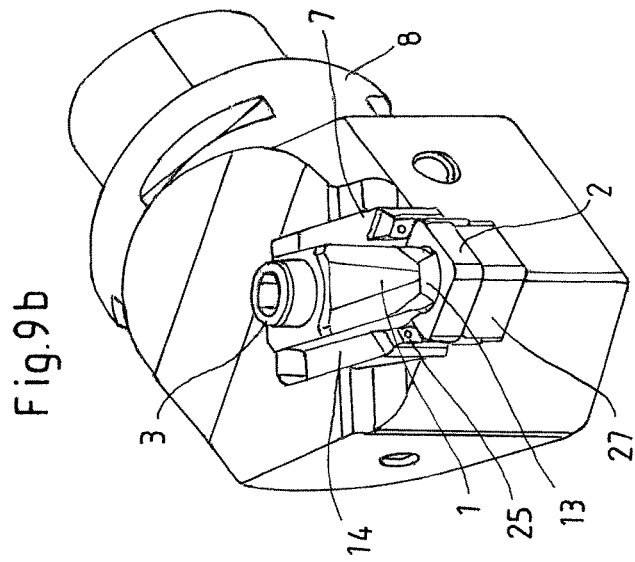
FIG. 9b shows an embodiment of a tool system according to the invention.
Figure 9A:
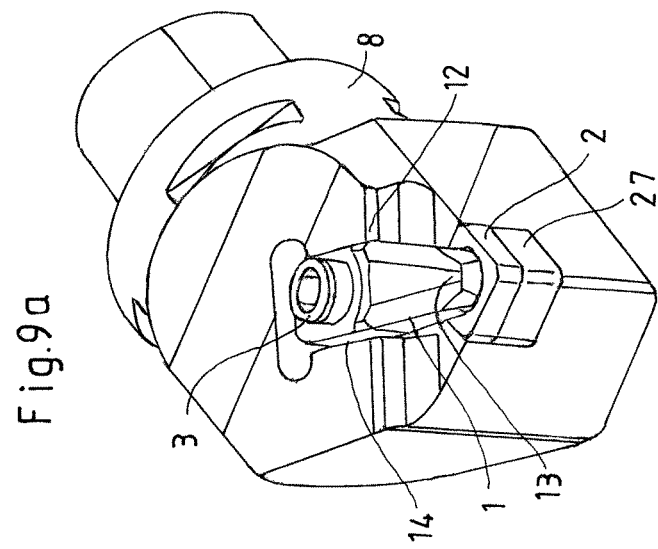
FIG. 9a shows an embodiment of a tool system according to the invention.

If the tool system is designed as a monoblock tool, the cutting plate is preferably arranged in a recess of the carrier tool, the clamping element is fastened via the clamping bolt on the carrier tool, the chamfer is arranged on the carrier tool, and when tightening the clamping bolt, the clamping element is pulled in the clamping direction towards the carrier tool. This embodiment is shown in FIG. 9a.

When the tool system is provided with an adapter, the adapter is preferably fastened in an adapter groove on the carrier tool, the groove with the parallel clamping element guides is arranged in the adapter, the clamping element is guided on both sides in the groove, and a continuous bore for the clamping bolt and continuous bores for fastening the adapter on the carrier tool are arranged in the adapter, the cutting plate engages in a receptacle in the adapter, the geometry of which receptacle is adapted to the cutting plate, and the chamfer is arranged on the adapter and not on the carrier tool. The lateral guides and the chamfer or retraction chamfer (see later) are purposely integrated on the adapter (and not on the carrier tool) so that alignment/axiality/parallelism of the clamping element and the center of the cutting plate correspond exactly. The adapter is preferably made from a hot-work tool steel.

All following configurations can be used for the monoblock tool as well as for the tool having an adapter.

Preferably, the tolerance of the guide width (B) of the groove, i.e., the tolerance of the distance of the clamping element guides from one another, is B±0.025, and the tolerance of the width of the clamping element, i.e., the tolerance of the distance of the guide surfaces on the clamping element from one another, is B±0.05. As a result of the tight tolerance of the guide, the clamping will maintain its position even in the event of heavy machining and potential short-term overload. Thus, in the case of a "crash", serious damage to the carrier tool and the workpiece can possibly be prevented.

Preferably, at the rear end of the clamping element, viewed from the cutting plate, a retraction chamfer forming the chamfer is arranged, and, in the case of the monoblock tool, there is a sliding chamfer that is arranged on the carrier tool and is adapted to the retraction chamfer, and in the case of the tool system having an adapter, there is a retraction chamfer at the rear end of the adapter, and the angle of the retraction chamfer and the sliding chamfer with respect to the horizontal is preferably 15 to 25 degrees, particularly a preference of 20 degrees. Due to the dimensions, positioning in the axial pulling direction of the clamping element from the center of the clamping element head to the center of the cutting plate together with the engagement of the clamping element bolt in the clamping element bore is therefore automatically provided via the bore in the clamping element.

Preferably, the clamping force $F_{bolt}$ of the clamping bolt acting on the clamping element is distributed among the chamfers $F_{Abolt}$ and the cutting plate $F_{WSPbolt}$, wherein $F_{bolt}=F_{Abolt}+F_{WSPbolt}$ and $F_{Abolt}=F_{WSPbolt}*X$, with X ranging between 1.6 and 1.8, and preferably being 1.7. Important for process-reliable clamping of the cutting plate is the selected length (lever) ratio at the clamping element. The tool system according to the invention is preferably designed to have a ratio of 1:1.7 (see FIG. 6). Through this it is achieved that 37% of the applied bolt force act as a clamp force onto the cutting plate.

Preferably, the clamping bolt is provided with an external hexagon on the bolt end. The clamping element bore extends through the carrier tool in such a manner that the bolt end of the clamping bolt is accessible. Through this, untightening the clamping bolt from below when changing the cutting plate is possible. This is necessary if, e.g., the tool is in an overhead position in the machine.

Preferably, cooling medium supply is integrated in the clamping element guides of the groove. Preferably, the clamping element guides are formed as ramps that slope towards the cutting plate and extend via two transition radii R3, R5 up to the upper side of the cutting plate. The outlet opening of the cooling medium supply is arranged between the radii R3 and R5. Coolant extends the service life of the tool system and the tool life of the cutting plate. In addition, it improves the workpiece surface.

Preferably, the ramp angle α of the ramp relative to the upper side of the cutting plate ranges between 3 and 10 degrees. This makes it easier to discharge the resulting chips.

Preferably, for special applications, a thread for a screw plug or a nozzle is arranged at the outlet opening.

Preferably, the use of this tool system is suitable for rough turning operations with cutting data of up to vc=3,000 m/min, ap up to 10 mm (depending on the plate size and the cutting plate geometry and the material to be machined) and a feed rate f of up to 1.0 mm.

The entire description refers to a cutting plate although it preferably involves an indexable insert (WSP).

The invention is explained below in greater detail with reference to the figures.

Figure 1A:
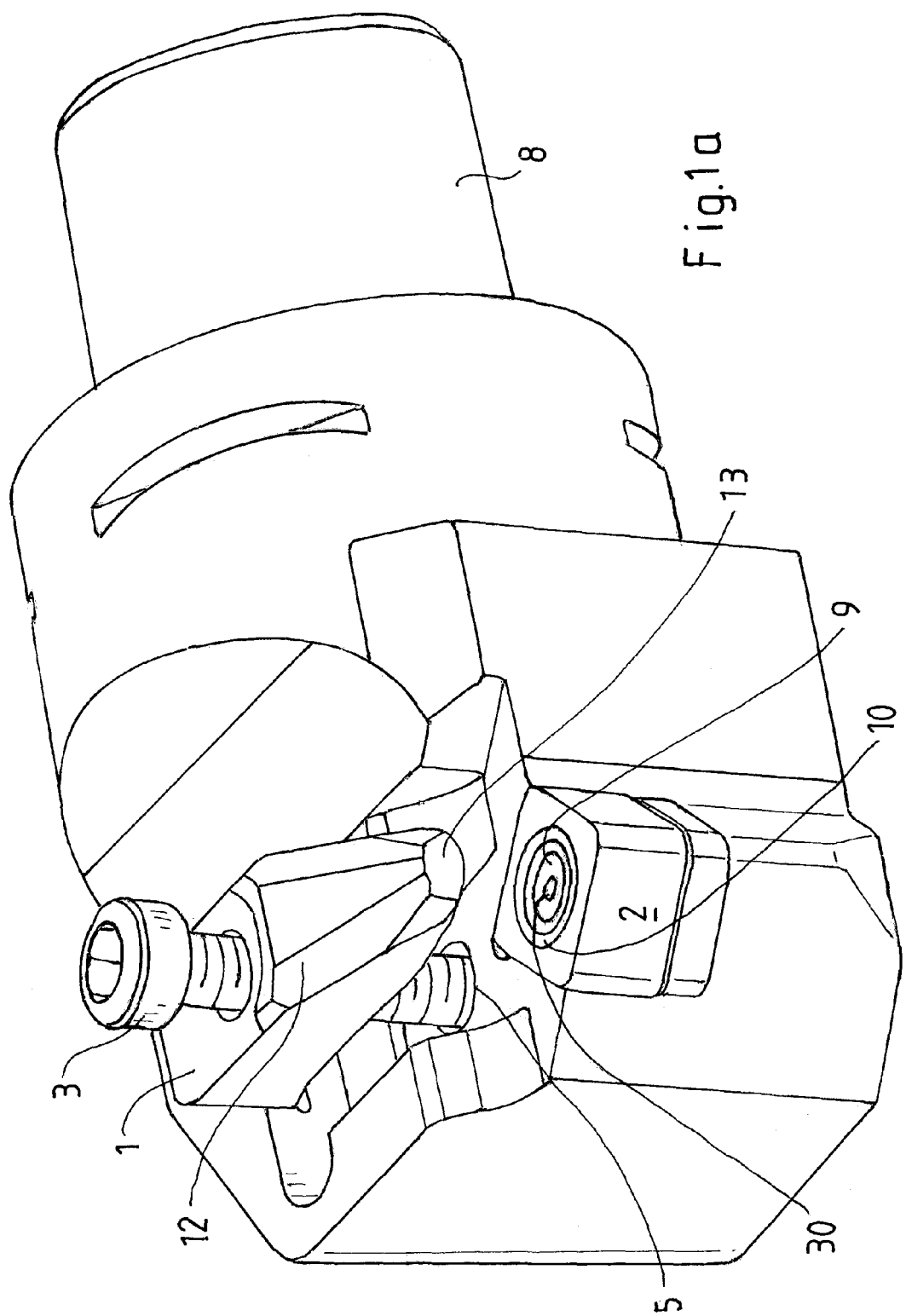
FIG. 1a shows an embodiment of a tool system according to the present invention.

In FIGS. 1a and 1b, two tool systems according to the invention are shown.

The reference number 8 designates in each case the carrier tool which has a recess for receiving a cutting plate 2. The cutting plates 2 according to the FIGS. 1a and 1b comprise a circular clamping recess 9 in which a spherical or circular projection 30 is arranged. The highest point of the projection 30 is arranged above the bottom of the clamping recess 9 and below the upper side of the cutting plate or below the cutting face.

Preferably, as can be seen in FIG. 1a, a second clamping recess 10 is arranged coaxial to the first clamping recess 9, wherein the first clamping recess 9 is arranged lower than the second clamping recess 10, and both, 9 and 10, are arranged lower than the upper side of the cutting plate. Through this, the vertical distance of the first clamping recess 9 from the second clamping recess 10 is always the same, even in the case of a grinding or lapping operation of the upper side of cutting plate.

For fastening the cutting plate 2 on the carrier tool 8, a clamping element 1 is fastened on the carrier tool 8 via a clamping bolt 3. The clamping bolt 3 extends through the clamping element 1 and is screwed into a clamping element bore 5 on the carrier tool 8.

When screwing in the clamping bolt 3, the tip of the clamping element 1 presses on the cutting plate 2. When using a cutting plate 2 with a clamping recess 9, an engagement element 11 formed as a cam or a sickle is arranged on the underside of the clamping element 1, which underside faces towards the cutting plate 2. This engagement element 11 engages into the clamping recess 9 and thereby anchors it on the carrier tool 8. In addition to the shape as a cam or a sickle, the engagement element can have any conceivable shape; a clamping element 1 without an engagement element (thus smooth) is also possible. However, when using a clamping element 1 without an engagement element, no retraction of the indexable insert is possible.

Figure 2C:
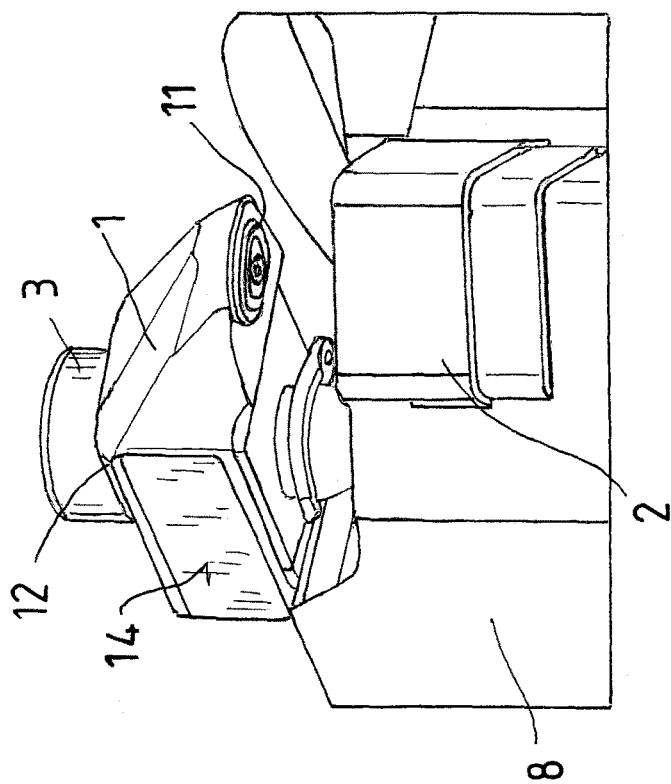
FIG. 2c is a view of a clamping element according to the invention.
Figure 2B:
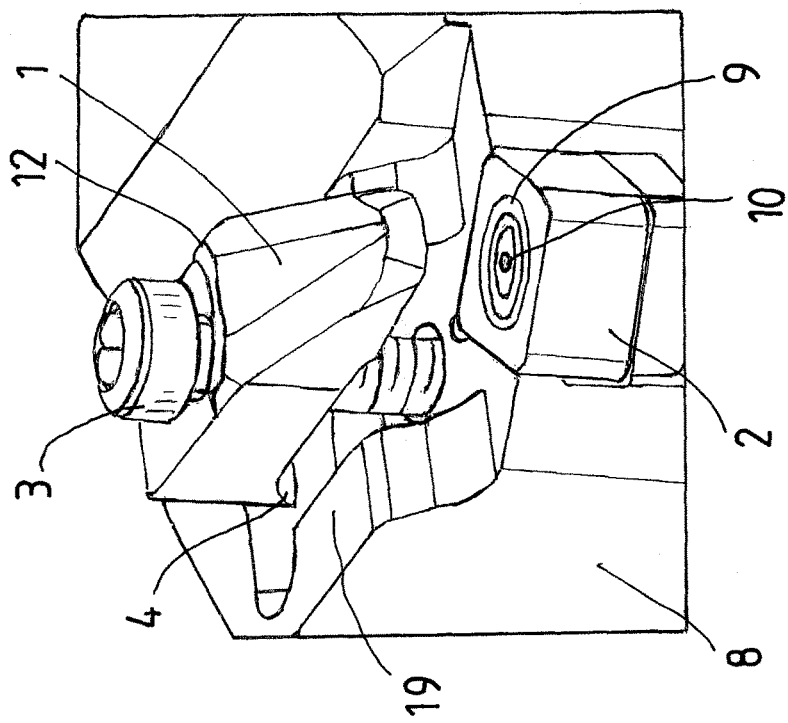
FIG. 2b is a view of a clamping element according to the invention.

According to the invention, the clamping element 1 (see FIGS. 2a, 2b, 2c) is guided on both sides on the carrier tool 8. For guiding, on the one hand, a groove 6 is arranged as a guide in the carrier tool 8 and, on the other, guide surfaces 14 are arranged on the clamping element 1, which guide surfaces have tight tolerances and guide the clamping element via a flat surface up to the contour transition 12. In FIG. 2a, the guide length L and the guide width B and the range thereof are shown. Preferably, [L] ranges between 10 and 22 mm (depending on the overall size), and [B] ranges between 10 and 20 mm (depending on the overall size). The tolerance of the guide width [B] on the carrier tool 8 is B±0.025, and the tolerance of the width of the clamping element is B±0.05. FIG. 2c shows in particular the guide surface 14.

Thus, guiding takes place very close to the clamping element tip 13. This ensures a secure engagement of the clamping element contour or the engagement element 11 into the first clamping recess 9 of the cutting plate 2. Thus, moreover, the position of the clamping element 1 is always the same (no twisting), independent of the spatial position (in the machine) of the tool, so that changing the cutting plate can also be carried out, e.g., in an overhead position (in relation to the tool) without any problems.

Due to the guide with the tight tolerances, the clamping element will maintain its position even during heavy machining and potential short-term overloading. In the event of a "crash", serious damage to the tool and the workpiece thus can possibly be prevented.

FIG. 3 illustrates that due to the dimensions, positioning in the axial pulling direction of the clamping element 1 from the center of the clamping element head to the center of the cutting plate (WSP) is automatically provided via the bore in the clamping element and the clamping element bolt. This is achieved in that at the rear end of the clamping element 1, viewed from the cutting plate 2, a retraction chamfer 4 is arranged, and a sliding chamfer 15 that is adapted to the retraction chamfer 4 is located on the clamping element 1. When the clamping element 1 is fastened with the clamping bolt 3, the sliding chamfer 15 slides on the retraction chamfer 4 until the clamping element bore's 5 wall facing towards the cutting plate 2 engages on the clamping bolt 3. This engaging of the wall of the clamping element bore 5 on the clamping bolt 3 is an important feature of the invention since through this, Δ2 equals zero (see FIG. 3), and the distance 16 from the longitudinal axis 17 of the clamping bolt 3 to the center 18 of the cutting plate 2 is always the same. The engagement element 11 on the underside of the clamping element 1 thus engages at a precisely defined position into the clamping recess. This is extremely important since otherwise undefined forces act on the cutting plate 2. The angles of the retraction chamfer 4 and the sliding chamfer 15 are preferably at 20 degrees relative to the horizontal.

Besides through the lateral guidance, the high process reliability is mainly achieved through the retraction of the clamping element by means of the retraction chamfer 15, see FIG. 3 or FIG. 4a), the form fit between the clamping element contour or engagement element and the cutting plate (indexable insert), as well as by the pressing of the engagement element 11 (clamping element nose) before the center of the clamping recess 9 (see, e.g., FIG. 1a). Through these conditions, the indexable insert (WSP) is pulled in a rotationally fixed manner into the plate seat (FIG. 4a). "Before the center of the clamping recess 9" means that viewed from the cutting edge, the engagement element engages before the center of the clamping recess in a formfitting manner therein, and "upward tilting" of the cutting plate is therefore prevented.

FIG. 5 illustrates that the retraction of the clamping element 1 is limited by the clamping element bore 5 (FIG. 6) abutting against the bolt shaft. Thus, sliding of the clamping element 1 out of the cutting plate recess 9 is prevented and the entire system clamping element/bolt/tool is braced. The cutting plate 2 is placed onto a support element 27 (support plate), and the support element 27 is anchored on the carrier tool 8 by means of a screw 28.

Of fundamental importance for process-reliable clamping of the cutting plate 2 is the length (lever) ratio selected at the clamping element. The tool system according to the invention is designed to have a ratio of 1:1.7 (see FIG. 6). Through this it is achieved that 37% of the applied bolt force act as a clamping force on the cutting plate.

The selected center distance "X" (see FIG. 6) is the result that is based on the consideration to clamp all cutting plate sizes and geometries that are relevant for the tool system and are commonly used in the market with a minimum number of clamping element sizes (variant minimization) in a technically proper manner in the tool system according to the invention. As an advantageous solution, 3 clamping element sizes with three different center distances (X=13.3 mm, X=16.15 mm and X=21.5 mm) have been developed. They cover all indexable insert geometries comprising inscribed circles from 9.52 mm to 25.40 mm. They all have a length (lever) ratio of 1:1.7.

If variant minimization would not be considered, a ratio of less than 1.7 to 1.0 would be technically better. Thus, with a ratio of 1:1, half of the applied force would press onto the cutting plate. The range from 1.7 to 2.2 is technically possible. However, the greater is the ratio, the lower is the force acting on the cutting plate. If, for example, the clamping bolt 3 acts with a force $F_{bolt}$=10,000N onto the clamping element 1, the force should preferably be divided according to the invention into $F_{Abolt}$=6,300 N acting on the chamfer 15 and $F_{WSPbolt}$=3,700 N acting on the cutting plate 2, because 6,300 N=3,700 N*1.7.

If the distance between $F_{Abolt}$ and $F_{bolt}$ is 1, then, according to the invention, the distance between $F_{bolt}$ and $F_{WSPbolt}$ is preferably 1.7. This is shown in FIG. 6.

Also, preferred is the range 1:1.6 to 1:1.8.

The clamping bolt 3 is provided at the bolt end (see FIG. 7) with an external hexagon 29 so as to enable untightening the clamping bolt 3 from below when changing the cutting plate. This is necessary, e.g., if the tool is in an overhead position in the machine. For M6, a width across flats AF4 was calculated. An AF4.5 would also be possible for M6. For M8, an AF5.5 was selected. Possible for M8 would be the range AF5 to AF6. The clamping element bore 5 extends through the carrier tool 8 so that the bolt end of the clamping bolt 3 is accessible.

The materials and tool holders are listed below:
The carrier tool 8 is preferably made from the materials heat treatable steel or hot-working steel
The clamping element 1 is preferably made of the materials:
  Steel 500-750 HV
  Carbide 850-1250 HV
  Ceramics 1250-1650 HV The clamping element can also be designed as a composite material in the variants:
Carrier tool from steel and cover from carbide
Base carrier from steel and cover from ceramics
All conventional tool holder systems such as CMS, HSK, KM, FTC, VDI, SK xxx are possible.

The tool system according to the invention can be used for all conventional tool types such as shank tools, boring bars and cartridges.

In an advantageous embodiment of the invention, a cooling medium supply is integrated in the carrier tool 8. The cooling medium supply is shown in the FIGS. 8a to 8d. The cooling medium supply is integrated in the two lateral clamping element guides 19 (FIGS. 8a and 8b). Through this, the cooling medium is brought very close in a target-oriented manner to the cutting process. Sliding of the chips is enabled by means of a ramp 20 having transition radii. The ramp angle α of the ramp 20 (FIG. 8d) relative to the upper side of the cutting plate ranges between 3 and 10 degrees. Interlocking of (continuous) chips, as it was often found in the past in coolant pipes, is therefore prevented. The height H of the ramp 20 preferably lies between 4 and 8 mm (FIG. 8c).

Depending on the tool size, the size of the outlet opening and the bore for the cooling medium ranges between 2 and 10 mm. At the outlet opening, a thread is arranged for a possible screw plug.

However, there is also the possibility to screw a nozzle 31 (see FIG. 8e) with a conical tip and a central bore into the outlet opening. Depending on the size of the tool, the bore diameter varies from Ø 1 mm to 6 mm. The nozzles are used if the cooling medium pressure is <20 bar and the "original" cooling medium bore tends to become soiled (plugged). Also, an increase in the exit velocity of the cooling medium is achieved in this manner, provided that the cooling medium volume at the machining process is sufficient.

The tool system according to the invention is provided as monoblock tool and also as a tool having an adapter. FIG. 9a shows the tool system as a monoblock tool, and FIG. 9a shows it as a tool having an adapter. The monoblock tool according to FIG. 9a is identical with the tool system according to FIG. 1a. The tool system according to FIG. 9b is explained below in greater detail with reference to FIGS. 10a to 10d.

The adapter 7 (see FIGS. 10a to 10d) integrates in itself all functions for process-reliable clamping of the clamping plate 2. The adapter 7 is fastened on the carrier tool 8 by means of screws and thus has two screw holes 21. Moreover, it also has a hole 22 for the clamping bolt 3. In order to guide the clamping element 1, the adapter 7 has lateral adapter guides 23, an adapter retraction chamfer 24 and, if necessary, a cooling medium supply similar to the monoblock tool. Depending on the adapter size, the outlet opening 25 and the bore of the cooling medium supply range between 2 mm and 5 mm. Supply of cooling medium takes place through the adapter guides 23. The adapter retraction chamfer 24 is arranged at the rear end of the adapter. The height of the adapter is 10 mm and the height of the adapter guides 23 is 6 mm. The dimensions of a preferred embodiment can be found in the FIGS. 10c and 10d. On that side of the adapter 7 that faces towards the cutting plate, plate seat walls 26 are arranged which correspond to the shape of the cutting plates and against which the cutting plates rest, as shown in FIG. 10c.

The lateral guides and the retraction chamfer (20 degrees) are purposely integrated on the adapter (and not on the tool) so that alignment/axiality/parallelism of the clamping element and the center of the cutting plate correspond exactly. The adapter is made of hot-working steel.

It is claimed:

1. A cutting tool system comprising:
a carrier tool;
a cutting plate with a clamping recess;
a clamping element having a clamping element bore; and
a clamping bolt;
wherein on the underside of the clamping element, which underside faces the cutting plate, an engagement element is arranged that is in clamping contact with the clamping recess in the engaged state and thereby anchors the cutting plate, and the clamping element is guided via a chamfer in such a manner that when tightening the clamping bolt, the clamping element is pulled in the clamping direction,
wherein the clamping element is arranged in a groove with parallel clamping element guides in which the clamping element is guided in a movable manner in the clamping direction;
wherein said clamping element has two parallel guide surfaces that rest flat against the clamping element guides so that the clamping element is guided on both sides in the groove;
wherein the clamping element bore is for the clamping bolt and is arranged in the clamping element, and in the engaged state of the cutting plate, the wall of the clamping element bore, which wall faces the cutting plate, rests against the clamping bolt; and
wherein viewed from the cutting edge of the cutting plate, the engagement element engages before the center of the clamping recess in a formfitting manner therein.

2. The tool system according to claim 1, wherein the tool system is designed as a monoblock tool;
wherein the cutting plate is arranged in a recess of the carrier tool, the clamping element is fastened via the clamping bolt on the carrier tool;
wherein the chamfer is arranged on the carrier tool; and
wherein when tightening the clamping bolt, the clamping element is pulled in the clamping direction towards the carrier tool.

3. The tool system according to claim 1, wherein the tool system is provided with an adapter;
wherein the adapter is fastened in an adapter groove on the carrier tool;
wherein the groove with the parallel clamping element guides is arranged in the adapter;
wherein the clamping element is guided on both sides in the groove;
wherein a continuous bore for the clamping bolt and continuous bores for fastening the adapter on the carrier tool are arranged in the adapter;
wherein the cutting plate engages in a receptacle in the adapter;
wherein the geometry of which receptacle is adapted to the cutting plate; and
wherein the chamfer is arranged on the adapter and not on the carrier tool.

4. The tool system according to claim 1, wherein the tolerance of the guide width (B) of the groove which is the tolerance of the distance of the clamping element guides from one another, is B±0.025, and the tolerance of the width of the clamping element which is the tolerance of the distance of the guide surfaces on the clamping element from one another, is B±0.05.

5. The tool system according to claim 1, wherein at the rear end of the clamping element, viewed from the cutting plate, a retraction chamfer forming the chamfer is arranged, and, in the case of the monoblock tool, there is a sliding chamfer arranged on the carrier tool and is adapted to the retraction chamfer, and in the case of the tool system having an adapter, there is a retraction chamfer at the rear end of the adapter, and the angle of the retraction chamfer and the sliding chamfer with respect to the horizontal is preferably 15 to 25 degrees.

6. The tool system according to claim 1, wherein the angle of the retraction chamfer and the sliding chamfer with respect to the horizontal is 20 degrees.

7. The tool system according to claim 1, wherein the clamping force Fbolt of the clamping bolt acting on the clamping element is distributed among the chamfers FAbolt and the cutting plate FWSPbolt, wherein Fbolt=FAbolt+FWSPbolt, and FAbolt=FWSPbolt*X, wherein X ranges between 1.6 and 1.8.

8. The tool system according to claim 7, wherein X is 1.7.

9. The tool system according to claim 1, wherein the clamping bolt is provided with an external hexagon on the bolt end.

10. The tool system according to claim 1, further comprising a coolant medium supply integrated in the clamping element guides of the groove.

11. The tool system according to claim 9, wherein the clamping element guides are formed as ramps that slope towards the cutting plate and extend via two transition radii R3, R5 up to the upper side of the cutting plate, and the outlet opening of the cooling medium supply is arranged between the radii R3 and R5.

12. The tool system according to claim 11, wherein the ramp angle a of the ramp relative to the upper side of the cutting plate ranges between 3 and 10degrees.

13. The tool system according to claim 11, wherein a thread for a screw plug or a nozzle is arranged at the outlet opening.

14. The tool system according to claim 12, wherein a thread for a screw plug or a nozzle is arranged at the outlet opening.

15. A method comprising rough turning a material to be machined with the tool system according to claim 1 with cutting data of up to vc=3,000 m/min, ap up to 10 mm and a feed f of up to 1.0 mm.

* * * * *